(12) United States Patent
Messier

(10) Patent No.: US 8,145,048 B2
(45) Date of Patent: Mar. 27, 2012

(54) PHOTO BOOTH AND IMPROVEMENTS THERETO

(76) Inventor: Sylvain Messier, Montreal (CA)

( * ) Notice: Subject to any disclaimer, the term of this patent is extended or adjusted under 35 U.S.C. 154(b) by 61 days.

(21) Appl. No.: 12/572,633

(22) Filed: Oct. 2, 2009

(65) Prior Publication Data

US 2011/0081140 A1 Apr. 7, 2011

(51) Int. Cl.
*G03B 15/00* (2006.01)
(52) U.S. Cl. .......................................................... 396/2
(58) Field of Classification Search .................. 396/2, 1, 396/3, 4, 5
See application file for complete search history.

(56) References Cited

U.S. PATENT DOCUMENTS

| | | | |
|---|---|---|---|
| 3,826,270 A * | 7/1974 | Hentges | 280/19.1 |
| 3,941,140 A * | 3/1976 | Beavers | 135/147 |
| 4,067,346 A * | 1/1978 | Husted | 135/153 |
| 4,077,418 A * | 3/1978 | Cohen | 135/95 |
| 5,016,035 A * | 5/1991 | Myles, Jr. | 396/2 |
| 5,383,099 A | 1/1995 | Peters | |
| 5,758,196 A * | 5/1998 | Laing | 396/1 |
| 5,778,258 A * | 7/1998 | Zamoyski | 396/2 |
| 5,784,651 A * | 7/1998 | Mauchan | 396/2 |
| 5,828,908 A | 10/1998 | Mauchan | |
| 6,068,556 A * | 5/2000 | Bernstein | 472/77 |
| 6,298,197 B1 * | 10/2001 | Wain et al. | 396/2 |
| 6,718,123 B1 | 4/2004 | Massarsky | |
| 6,788,886 B2 * | 9/2004 | Saigo et al. | 396/4 |
| 7,013,904 B2 | 3/2006 | Kofler | |
| 7,386,227 B1 * | 6/2008 | Henderson | 396/164 |
| 7,680,401 B1 * | 3/2010 | Adelstein | 396/1 |
| 7,796,869 B2 * | 9/2010 | Bakewell | 396/2 |
| 2005/0276587 A1 | 12/2005 | Massarsky | |
| 2008/0166111 A1 * | 7/2008 | Didow et al. | 396/3 |
| 2008/0310829 A1 | 12/2008 | Bakewell | |
| 2009/0067825 A1 | 3/2009 | Valvo et al. | |
| 2009/0269045 A1 * | 10/2009 | Astill | 396/3 |

FOREIGN PATENT DOCUMENTS

JP 2007025108 A1 2/2007

OTHER PUBLICATIONS

The Portable Photobooth, Internet Website, Oct. 1, 2009.
Fantasy Entertainment/Event Photo Booth, Internet Website, Oct. 1, 2009.
International Search Report of PCT/CA2010/001551, which claims priority from the present application.

* cited by examiner

*Primary Examiner* — Rodney Fuller

(57) ABSTRACT

A photo booth including a frame defining support members for a plurality of adjacent standing walls. The photo booth further includes a plurality of flexible panels. Each panel is mountable to corresponding support members of one of the plurality of walls. One side of each panel is light reflecting. In an aspect, the photo booth further includes photographic equipment including at least one light for installing in an aperture defined in one of the panels. In another aspect, at least one of the panels is translucent and includes a marketing graphic on an opposite side, and upon actuation of the light, the marketing graphic is illuminated.

11 Claims, 3 Drawing Sheets

US 8,145,048 B2

PHOTO BOOTH AND IMPROVEMENTS THERETO

FIELD OF THE INVENTION

The present invention relates to a photo booth, and more particularly to improvements thereto.

BACKGROUND OF THE INVENTION

Photo booths are very useful for taking pictures by oneself. Typical photo booths found in public places include a small rigid chamber. The chamber has a front wall onto which is installed the photographic equipment and a seat for installing a person to be photographed. The chamber is usually seized to receive one or two persons at the same time. Its rigid construction makes it sturdy. However, such construction also has several drawbacks.

Space inside the chamber is usually very small, thus not adapted for accommodating several persons. Also, the rigid construction makes it difficult to move from one location to another, and requiring special equipment to do so. As the chamber is quite small, it is not possible to provide quality surrounding lighting so as to take pictures of professional quality.

There is therefore a need for a photo booth that is more convenient to move, can accommodate several persons at the same time, and providing quality surrounding lighting.

SUMMARY OF THE INVENTION

The present invention relates to a photo booth that is more convenient than traditional photo booths found in public places.

For doing so, in a first aspect, the present invention provides a photo booth for receiving photographic equipment comprising at least one light. The photo booth comprises a frame and a plurality of flexible panels. The frame defines support members for a plurality of adjacent walls. Each panel is adapted to be affixed to corresponding support members of one of the adjacent walls. One side of each panel is adapted to reflect light.

In another aspect, the present invention provides a photo booth comprising a frame, a plurality of flexible panels and photographic equipment. The frame defines support members for a plurality of adjacent walls. Each panel is adapted to be affixed to corresponding support members of one of the walls. One side of at least one of the panels is adapted to reflect light. The photographic equipment is adapted to be installed proximate an aperture defined in one of the panels. The photographic equipment comprises at least one light.

In yet another aspect, the present invention provides a photo booth for marketing purposes. The photo booth comprises a frame, a plurality of flexible panels and photographic equipment. The frame defines support members for a plurality of adjacent walls. Each panel is adapted to be affixed to corresponding support members of one of the walls. One side of at least one of the panels is adapted to reflect light. At least one of the panels is translucent and comprises a marketing graphic on an opposite side. The photographic equipment is adapted to be installed in an aperture defined in one of the panels, and comprises at least one light. Upon actuation of the light, the marketing graphic is illuminated.

BRIEF DESCRIPTION OF THE DRAWINGS

In the following description, the following drawings are used to describe and exemplify the present invention.

DETAILED DESCRIPTION OF THE INVENTION

Figure 1:
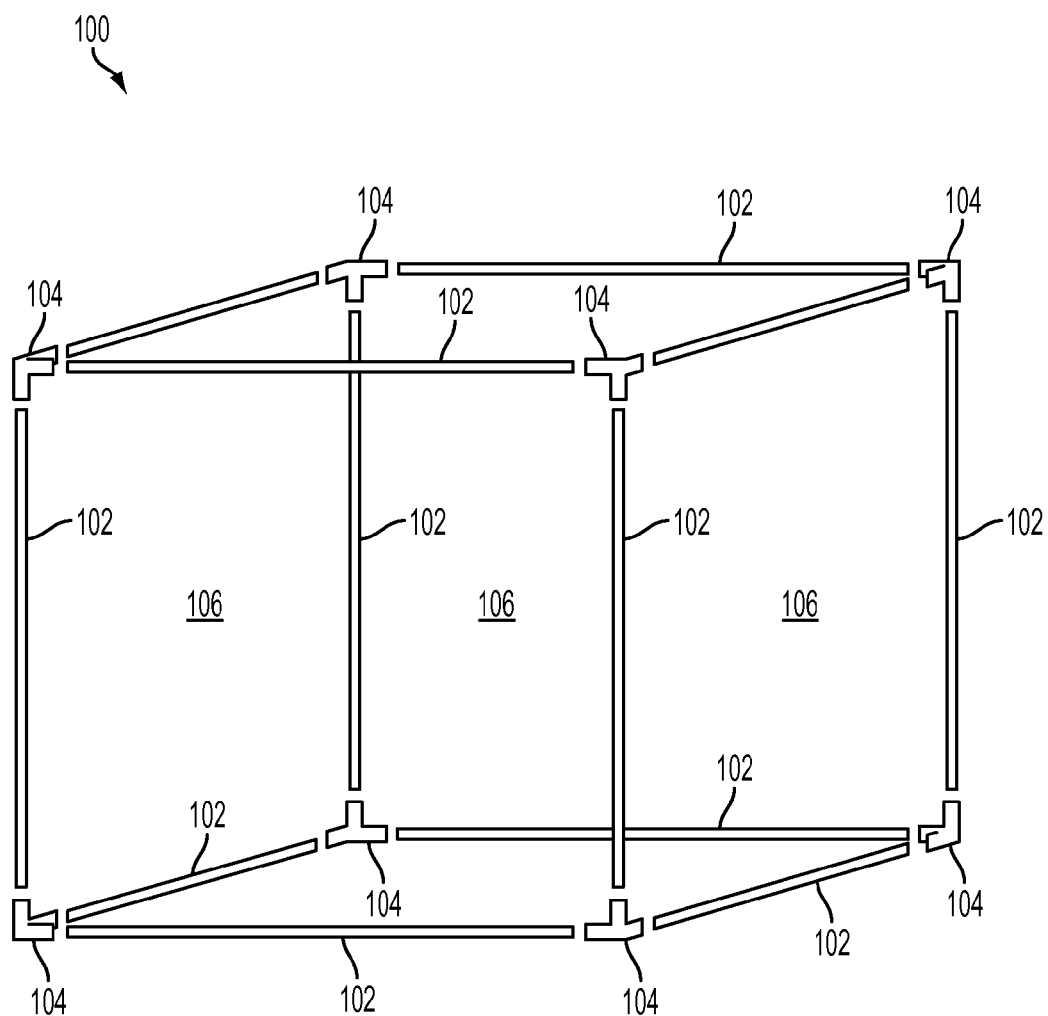
FIG. 1 is a schematic diagram of an exemplary exploded frame.

The present invention relates to photo booths and improvements thereto. The photo booth comprises a frame and a plurality of flexible panels. Reference is now made to FIG. 1, which depicts an exemplary exploded frame 100. The frame 100 comprises a plurality of support members 102 and connectors 104. The frame 100 defines a plurality of adjacent standing walls 106. Although FIG. 1 depicts four standing walls, the present photo booth is not limited to such a configuration. The present photo booth could have any desired number of adjacent walls, and furthermore a ceiling and a floor. The frame 100 could define a rectangular perimeter, or any other appropriate shape, as for example a square, an hexagon, an octagon, an ellipse, a circle, etc. The support members 102 and connectors 104 may be adapted to define vertical walls, or any other appropriate shape of walls. Because of this flexibility, the photo booth can have a regular shape or an irregular shape. Any three-dimensional shape can further be achieved.

The support members 102 may consist of a single piece of tube, or a series or tubes connecting to one another. The support members 102 and the connectors 104 may have any cross-sectional shapes (circular, square, triangular, hexagonal, octagonal, rectangular, etc.). The support members 102 and the connectors 104 may be made of various materials such as for example: metal, alloy, plastic, carbon fiber, etc. The support members 102 are adapted for securely affixing to the connectors 104. The size of the photo booth depends on the length and number of support members 102 used. The frame 100 may thus have a size corresponding to one or two persons of average size standing up or sitting, or may correspond to a small room in which 8-10 persons may comfortably stand or sit. To facilitate carrying, the frame 100 is collapsible.

Figure 2:
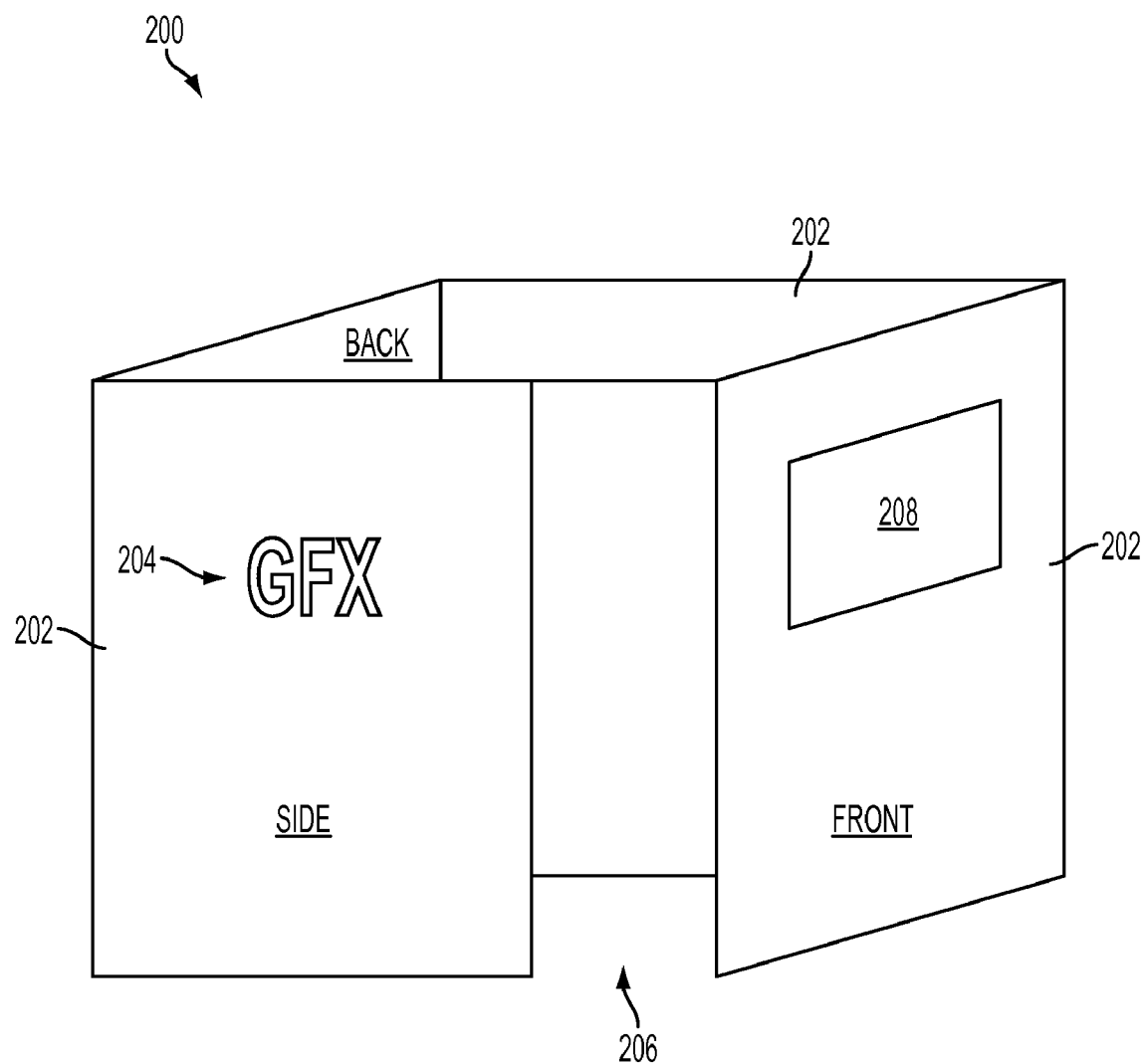
FIG. 2 is a schematic diagram of an exemplary photo booth in accordance with a first aspect.

Reference is now made concurrently to FIGS. 1 and 2, where FIG. 2 depicts a schematic diagram of an exemplary photo booth 200 in accordance with a first aspect. Although the photo booth of FIG. 2 represents a rectangle, the present photo booth is not limited to such a shape which is used for simplicity purposes only. The photo booth 200 comprises the frame 100, and five flexible panels 202, although the present invention is not limited to such a number of flexible panels. The panels 202 are adapted to be affixed to the support members 102 of the frame 100. There are multiple ways to affix the panels 202 to the support members 102. The support members 102 may be inserted in pockets at the extremities of the panels 202, or the panels 202 may comprise a flap that wraps the support members, the flap having a corresponding attachment on another side of the panel, or any other similar ways.

The four standing walls include a front wall, two sidewalls, and a back wall. The fifth flexible panel 202 is the ceiling of the photo booth 200. The front wall includes an aperture 208 for receiving photographic equipment, such as for example a camera, a screen to shown the pictures taken, one or several lights, and any other equipment required to take pictures and deliver the pictures taken. Such means may include for example an internet access for e-mailing the pictures taken to an e-mail account, a USB connection for transferring the pictures thereon, a Bluetooth link for transferring the pictures taken to a Bluetooth capable device, a printer to print the pictures, a fund module for receiving necessary funds to take the pictures, etc.

One of the sidewall includes a door 206 to provide access to the inside of the photo booth. The door 2006 may be closed by a curtain (not shown), or may be left open. The back or the sidewalls may comprise an inside graphic (not shown) on the inside of the photo booth. The inside graphic may relate to a public event where the photo booth is installed, or depict a seasonal picture.

One or several panels 202 have a side to be mounted inside the photo booth, that reflects light. By appropriately reflecting light inside the photo booth, it is possible to create a balanced lighting environment to improve the quality of pictures taken by the photo booth. At least one of the panels is also adapted for receiving an exterior graphic 204 that is printed thereon, such as marketing for example.

A floor (not shown) may further be provided if desired. Addition of the floor may provide additional functionalities to the photo booth, while improving light reflection, thus overall lighting quality.

The panels 202 may be made of various materials, such as fabric, plastic, plasticized paper, etc. In order to avoid regrettable incidents, the material selected for the panels 202 is preferably fireproof, water resistant and shatter proof. In a particular aspect of the present invention, the panels 202 are made of an extensible fabric. Use of the extensible fabric provides several advantages over other materials. First, extensible fabric allows building a photo booth that is lightweight and easy to carry. Furthermore, the extensible fabric provides a simple way of providing a white side that can be almost absolutely wrinkle free and thus reflects light very well. The extensible fabric is also convenient for applying the exterior graphic 204 thereon.

To add to the effect of the graphic 204, the panel 202 on which it is applied, and other panels as well if desired, may be made of a translucent material. Upon actuation of the light, the translucent material allows some of the light to pass through to illuminate the exterior graphic 204. If the light used by the photo booth is a continuous light, the exterior graphic 204 is continuously illuminated when the photo booth is in operation. In the event that a flash is used, the exterior graphic 204 will be illuminated only upon actuation of the flash.

When the photo booth is used concurrently as an apparatus for taking pictures and a publicity medium, selection of the light used to take picture may be affected by the desired impact for the exterior graphic 204. A continuous illumination of the exterior graphic 204 provides a constant reminder. However, a flashing exterior graphic 204 may be more noticeable in darker surroundings such as for example evening events.

Figure 3:
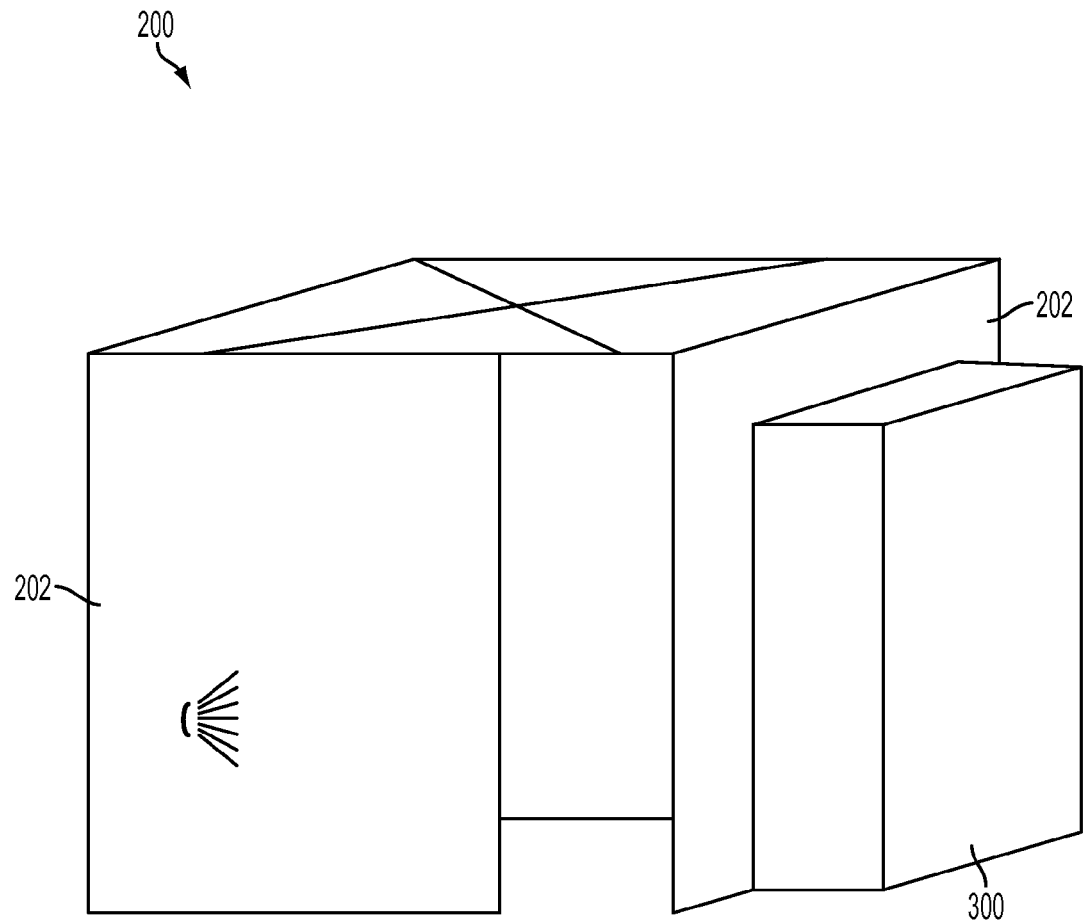
FIG. 3 is a schematic diagram of an exemplary photo booth in accordance with another aspect.

Reference is now made to FIG. 3, which is a schematic diagram of an exemplary photo booth in accordance with another aspect. In this other aspect, the photo booth 200 is further equipped with photographic equipment 300. The photographic equipment 300 is preferably enclosed in a sturdy case that is securely affixed to the ground. The case may further include a compartment (not shown) for receiving the frame 100 and the panels 202 when collapsed. The case is adapted to affix to the aperture 208 so as to provide the necessary light and photographic equipment.

In addition to all the formerly discussed improvements, the current photo booth 200 could further comprise a retractable seat, and a manual actuator. Photo booths are usually provided with a timer for automatically actuating shooting of pictures. It could be possible with the photo booth of the present invention to further provide a floor in which a manual actuator could be incorporated. Thus, to actuate taking a picture, a user would have to press an indicated area on the floor of the photo booth.

The photo booth 200 of the present invention is adapted for taking pictures in public areas such as shopping malls, subway stations and any other type of public places. In addition, it could be used in public events such as festivals, shows, congresses, weddings, proms, publicity gigs, etc. It could be used either inside or outside. By using waterproof panels and a waterproof casing, the photo booth 200 can be installed in exterior events.

When used in the context of a wedding or a prom, the photo booth 200 can be installed in an area where all participants can go and take pictures as souvenir of the event. Instead of being printed, the photos could be stored for further copying to all participants of the event. When the photo booth is used in the context of a publicity gig, the pictures taken can be stored for selection of the best picture of the evening, and identifying a new face corresponding to the advertised product or service.

Because of its inherent flexibility, the photo booth of the present invention opens up a new dimension of possibilities for public events, which was not possible with former photo booths which were heavy, bulky, difficult to carry, and too small to be convenient. The present photo booth could further be used for domestic applications, such as taking professional quality pictures of children. A visit to a photograph can be expensive, and having access to a collapsible photo booth that improves lighting and overall picture quality could be a great asset. To increase the possibilities, the back wall and/or sidewalls of the photo booth could be sold separately, with different options of background. Thus it could be possible to either buy or rent backgrounds, for seasonal pictures.

The photo booth could further be rented for family gatherings, where everyone can have their picture taken, either alone or in a group, as the dimensions of the photo booth are not restricted.

The present invention has been described by way of preferred embodiments. It should be clear to those skilled in the art that the described preferred embodiments are for exemplary purposes only, and should not be interpreted to limit the scope of the present invention. The photo booth as described in the description of preferred embodiments can be modified without departing from the scope of the present invention. The scope of the present invention should be defined by reference to the appended claims, which clearly delimit the protection sought.

The invention claimed is:

1. A photo booth comprising:
    a frame defining support members for supporting adjacent standing walls;
    flexible panels, each panel being mountable to corresponding support members of one of the standing walls, an interior side of at least some of the panels being light reflective;
    photographic equipment for installing in an aperture defined in one of the panels, the photographic equipment comprising at least one light provided inside the photo booth;
    at least one of the at least some of the panels including a translucent material defining an exterior side and showing a graphic;
    wherein upon actuation of the light, the graphic is illuminated by the light from inside the photo booth.

2. The photo booth of claim 1, wherein the light is a flash.

3. The photo booth of claim 2, wherein the exterior graphic is illuminated from inside the photo booth only upon actuation of the flash.

4. The photo booth of claim 1, wherein the frame is collapsible.

5. The photo booth of claim 1, wherein the flexible panels are made of extensible fabric.

6. The photo booth of claim 1, wherein the at least some of the panels have configurations, locations, dimensions and optical properties that define an inside surface that is substantially uniformly illuminated when illuminated by the at least one light.

7. The photo booth of claim 1, wherein the support members define an enclosure, the enclosure defining an entrance.

8. The photo booth of claim 7, wherein the enclosure defines a light reflective inside surface.

9. The photo booth of claim 7, wherein the panels are stretched and mounted on the support members.

10. The photo booth of claim 9, wherein the panels have a configuration, dimensions and optical properties creating a surface that is substantially uniformly illuminated by the at least one light when the at least one light is activated.

11. The photo booth of claim 1, wherein the support members define a pair of opposed side walls and a back wall extending therebetween, a subset of the panels being stretched over the support members to form the side and back walls.

* * * * *